United States Patent [19]

Wilson

[11] 4,291,423
[45] Sep. 29, 1981

[54] HEAT RECLAMATION FOR SHOWER BATHS, SINKS, AND OTHER FLUID RECEIVING VESSELS

[76] Inventor: Mahlon T. Wilson, 5 Erie La., Los Alamos, N. Mex. 87544

[21] Appl. No.: 135,362

[22] Filed: Mar. 31, 1980

[51] Int. Cl.³ .............................................. A47K 3/22
[52] U.S. Cl. ........................................ 4/598; 4/545; 4/612; 4/613; 4/597
[58] Field of Search ................... 4/598, 191, 192, 545, 4/584, 619, 597, 602, 605, 612, 613, ; 138/38

[56] References Cited

U.S. PATENT DOCUMENTS

| | | | |
|---|---|---|---|
| 2,075,471 | 3/1937 | Sahloff | 4/538 |
| 3,263,242 | 8/1966 | Will | 4/598 |
| 3,606,617 | 9/1971 | Frazier | 4/596 |
| 4,176,787 | 12/1979 | Gary | 138/38 X |

FOREIGN PATENT DOCUMENTS 49164 8/1934 Denmark ............................... 4/598

Primary Examiner—Henry K. Artis

[57] ABSTRACT

A shower bath, sink, or other fluid receiving vessel is described wherein heat is reclaimed from the drain fluid to warm the incoming cold water to reduce the amount of hot water which must be mixed in to produce water of the temperature desired for use within the vessel. The improvement consists of a cover pan for collecting the received fluid and depositing it on a particular region of the vessel floor which is contoured to direct the received fluid along a particular channel to a drain. The cold water supply tube is positioned within the channel in contact with the draining fluid. The warmer drain fluid transfers heat energy into the cooler water flowing within the submerged cold water supply tube.

9 Claims, 4 Drawing Figures

HEAT RECLAMATION FOR SHOWER BATHS, SINKS, AND OTHER FLUID RECEIVING VESSELS

This invention relates to heat reclamation and more particularly to means whereby heat contained in fluid drained from shower baths, sinks, and other fluid receiving vessels is reclaimed.

Shower baths and some types of sinks, such as those utilized in photographic film washing, are traditionally supplied with sources of hot and cold water which must be mixed to provide process water of the proper temperature for utilization in the washing or rinsing task. This tempered water is then collected by the shower receptor or sink and directed into the building sanitary drainage system without attempting to recover that heat in the discarded water.

The object of the present invention is to teach a novel, convenient, and inexpensive means for transferring heat from the waste water into the incoming cold water, thereby reducing the amount of hot water required to achieve the proper process water temperature.

SUMMARY

Drain fluid is collected by a cover pan and is deposited into a channel contoured in the floor of the fluid receiving vessel. The channel directs the drain fluid to the vessel drain. The cold water supply tube is positioned within the channel in contact with the draining fluid. The warmer drain fluid transfers heat energy into the cooler water flowing within the submerged cold water supply tube, thereby reducing the amount of hot water which must be mixed in to produce water of the temperature desired for use within the vessel.

DESCRIPTION OF A PREFERRED EMBODIMENT

Figure 1:
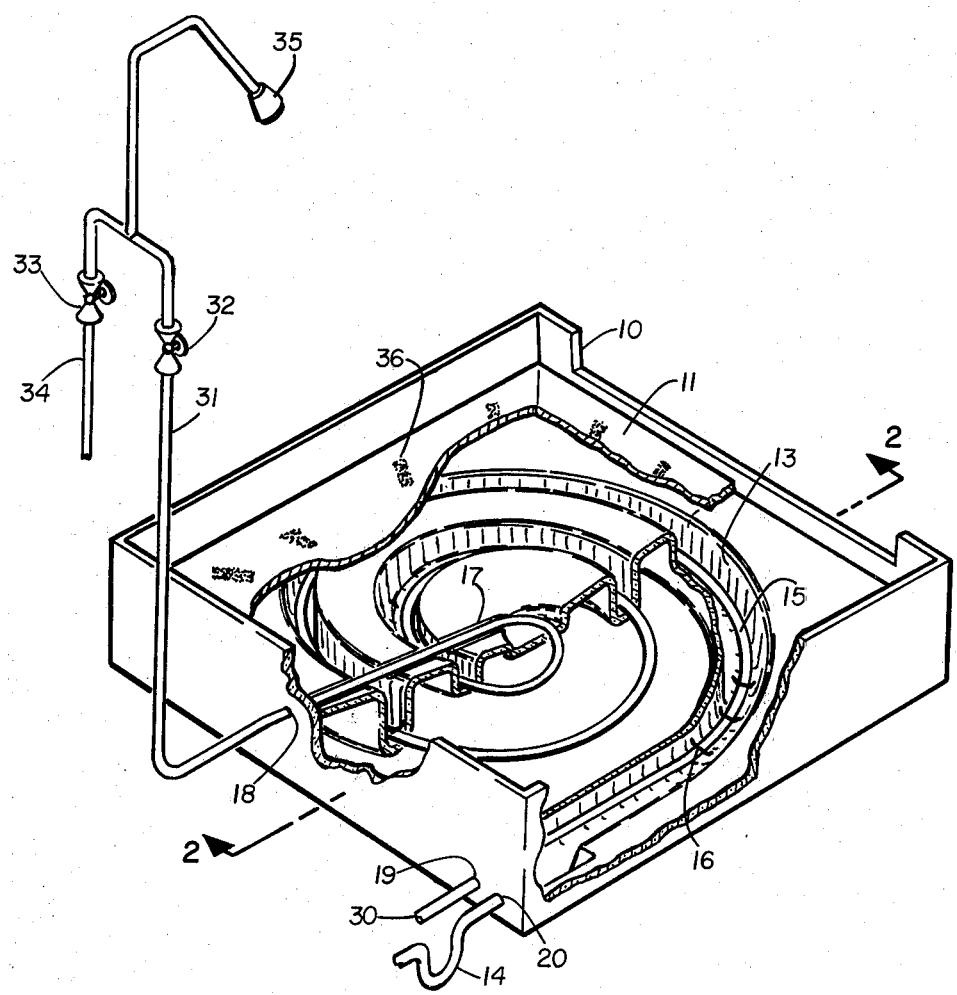
FIG. 1 is a partially sectioned perspective view of a preferred embodiment in accordance with the invention.
Figure 2:
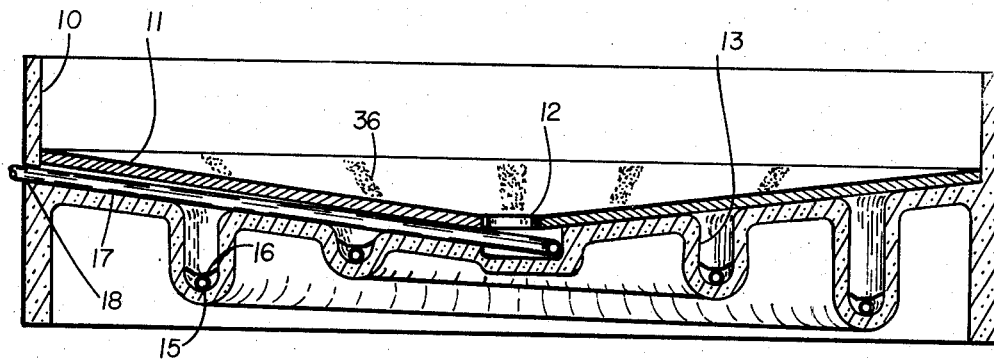
FIG. 2 is a cross sectional view of the portion of the embodiment indicated by the section lines 2—2 in FIG. 1.
Figure 3:
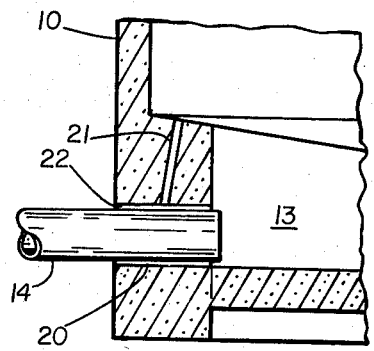
FIG. 3 is a partial cross sectional view of a detail of the drain pipe attachment means utilizing a sealant.
Figure 4:
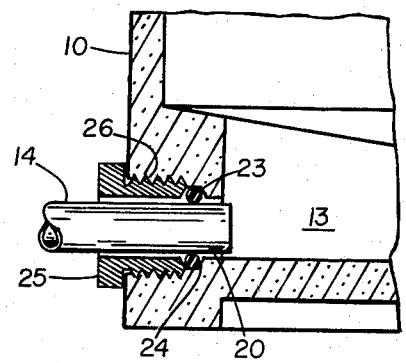
FIG. 4 is a partial cross sectional view of a detail of the drain pipe attachment means utilizing a compression seal.

Reference is now made to the preferred embodiment illustrated in FIG. 1, a shower receptor in this example, showing a fluid receiving vessel 10, with the cover pan 11 cut away to reveal the concealed features of the embodiment. Cover pan 11 is sloped to drain fluid falling upon it through screen 12 as shown in FIG. 2. The draining fluid flows along a channel 13 that is contoured into the floor or upward facing surface of the fluid receiving vessel 10 and exits the vessel 10 through drain pipe 14. Tubing 15 enters vessel 10 through hole 19 and is held against the bottom of channel 13 by clips 16 and is routed out of vessel 10 within a groove 17 and through exit hole 18. End 30 of tubing 15 is connected to a source of cold fluid, end 31 of tubing 15 is connected to a cold fluid flow control valve 32. Hot fluid flow control valve 33 is connected to a source of hot fluid by tubing 34. The fluid passing through valves 32 and 33 exits through nozzle 35 and is directed into cover pan 11, the upper surface of which is contoured or textured with non-slip spots 36 as required for the particular use of this invention. Drain pipe 14 penetrates the wall of vessel 10 through hole 20 to receive drain fluid from channel 13. FIG. 3 shows how a watertight seal is provided by the injection of a sealant, such as silicone rubber, into hole 21 which communicates with hole 20, filling the annular region 22 defined by the exterior surface of pipe 14 and the interior surface of hole 20. FIG. 4 depicts an alternative watertight seal wherein a pliable material 23, such as a neoprene 'O' ring, is compressed into the annular region defined by the exterior surface of pipe 14 and the enlarged interior surface 24 of hole 20. The compressive force is provided by the rotation of a threaded fitting 25 into a threaded enlargement 26 of hole 20. Tubing 15 may penetrate the wall of vessel 10 above the elevation of the drain fluid within channel 13, thereby obviating sealing at holes 18 and 19, or may be sealed by means such as illustrated and described for drain pipe 14.

OPERATION OF THE PREFERRED EMBODIMENT

The operation of the preferred embodiment illustrated in the figures and heretofor described, a shower receptor as used in a shower bath, is begun by adjusting the hot fluid, water, control valve 33 and the cold fluid, water, control valve 32 until the volume flow rate and temperature of the water spraying from nozzle 35 is as desired. A representative volume flow rate from nozzle 35 is 3 gallons per minute (gpm) and a representative temperature is 100° F. obtained by mixing 1.5 gpm of cold water at 55° F. with an equal flow of hot water at 145° F. Some of the water exiting nozzle 35 drops through the air wetting the person using the shower bath; some strikes the walls of the enclosure, not shown, of which vessel 10 forms the floor; and the remainder falls unimpeded. All the water is collected by cover pan 11 and flows down its sloped surface to screen 12. A representative cover pan 11 is three feet square and is dished downward from the perimeter to the center at a slope of one-fourth inch per foot. It is fabricated of pressed steel and coated with baked-on enamel with grit patches 36 bonded to the upper surface to provide non-slip protection for the bather. Pan 11 may be constructed of a variety of alternative materials, examples of which are resin impregnated fibers and cemented aggregates, either of which are formed to the proper shape in reusable molds. Pan 11 may have a variety of finishes, such as ceramic tile or paint. The drain water is filtered of hair, soap pieces, and other drain fouling material as it passes through screen 12. A representative screen contains twenty-four holes that are three-sixteenths of an inch in diameter. The drain water, as it passes through screen 12, has cooled to a representative temperature of approximately 93° F., primarily due to its dispersed and intimate contact with the air as it fell from nozzle 35. Immediately below screen 12 the drain water enters channel 13 contoured into the floor of vessel 10. Vessel 10 is constructed of a structurally strong and waterproof material such as resin impregnated fibers, cemented aggregates, or pressed and welded steel that has a baked enamel coating. Channel 13 slopes downward toward drain pipe 14 at a rate of between one-eighth and one-fourth of an inch per foot of channel length. Channel 13 may have various cross sectional shapes, a representative one of which would be a 'U' shape with a width of two inches. Tube 15 conducts cold water from a source 30 to valve 32 and is retained against the bottom of channel 13 by numerous chips 16 which allow tube 15 to expand and contract by sliding a small distance across the bottom of channel 13. A representative tube 15 is trade size one-half inch diameter Type L copper tubing. Clips 16 are fabricated from a rust resistant material such as stainless steel and are retained either by spring action or with a fastener that penetrates into the wall of channel 13. The cold water flowing in tube 15 progresses in a direction opposite to that of the drain water flowing over the exterior of the tube 15 within channel 13 resulting in what is known as a counterflow heat exchanger. The length of channel 13, and tubing 15 within it, is determined by the amount of heat that it is desired to recover from the drain water. Longer lengths permit relatively more heat to be recovered. Soap, scum, and hard water scale coatings on the exterior surfaces of tubing 15 impede the transfer of heat, therefore additional lengths of channel 13 and tubing 15 must be provided and cover pan 11 must be easily removable to provide access to facilitate cleaning away the deleterious coatings. Representative tubing 15 and channel 13 lengths are thirty feet for which the cold water temperature will be increased to approximately 80° F. To maintain the representative output of 3 gpm at 100° F., the cold water flow is increased from 1.5 to 2.1 gpm and the hot water flow is reduced from 1.5 to 0.9 gpm, a forty percent saving of hot water. The water flow rates are adjusted with valves 32 and 33 which require adjustment for the first minute as temperatures stabilize. In practice, a constant output temperature mixing valve may be utilized at the location of valves 32 and 33 to automatically adjust the hot and cold water flow rates as the cold water warms up.

While the above description contains many specificities, these should not be construed as limitations on the scope of the invention, but rather as an exemplification of one preferred embodiment thereof. Many other variations are possible, for example:

(a) The invention may be incorporated within one-piece shower bath enclosures that include the walls and other surfaces attached to the fluid receiving vessel 10 as a continuous and seamless unit.

(b) The cold water tubing and the drain pipe penetrations 18,19,20 into the receiving vessel 10 may penetrate other surfaces as convenient to the particular use.

(c) The upward facing surface of the fluid receiving vessel 10 requires contouring to form channel 13 as taught in this invention. The form of the opposite, or downward facing surface, would be influenced by the materials of construction, for example, it may be cast solid and flat if fabricated of cemented aggregates.

(d) Fluid receiving vessel 10 may be of any shape, for example, square, rectangular, round, or oval, and shallow or deep; it may also be formed into sinks and tubs as befits the application.

(e) A spiral route for channel 13 and tube 15 is illustrated in FIG. 1. Other routes may be used as suits the application; for example, a serpentine route may be preferred for fluid receiving vessels 10 that have a long and narrow shape.

(f) End 31 of tube 15 may be connected to a fluid heating device, the output of which is connected to valve 32, eliminating tube 34 and valve 33. This variation would find utility in applications such as dish rinsing wherein rapid and good control of the water temperature at nozzle 35 is not required.

(g) The teachings of this invention are applicable to applications utilizing fluid that is chilled to a temperature below the fluid supply temperature. The cold drain fluid is utilized to cool the supply fluid, thereby reducing the amount of refrigeration required.

(h) Either the cover pan 11 or the contoured floor of vessel 10 containing channel 13, or both, may be the structural member capable of supporting the weight of the occupant or the items being rinsed.

(i) Tube 15 may consist of coaxial tubes and may contain fins or other surface extending convolutions to enhance the transfer of heat energy.

(j) The teachings of this invention may be utilized to retrofit existing fixtures, such as shower baths and sinks, by inserting vessel 10 into the existing fixture. Drain hole 20 may be located over the existing fixture drain. Centrally located drains may be accessed by curving channel 13 and tube 15 through an angle of 180° And directing them back toward the center in a spiral pattern adjacent to the outward spiral shown in FIG. 1.

(k) The teachings of this invention may be utilized in shower baths having poured-in-place concrete floors such as those found in public shower baths in gymnasiums. Channel 13 is cast into the concrete floor and covered with a pan 11 of suitable material and covering, such as a ceramic tile covered resin impregnated fiber pan.

(l) The fluid flowing within tube 15 may be utilized at locations other than the particular fluid receiving vessel 10 providing heat to the fluid within tube 15.

Various other features and advantages not specifically enumerated will undoubtedly occur to those versed in the art, as likewise will many variations and modifications of the preferred embodiment illustrated and the variations thereto enumerated, all of which may be achieved without departing from the spirit and scope of the invention as defined by the following claims.

What I claim is:

1. A fluid receiving vessel incorporating an energy exchange device for reclaiming heat energy comprising:
   (a) a pan for collecting the received fluid and depositing it on a particular region of
   (b) a contoured floor for directing the flow of the received fluid along a particular channel containing
   (c) tubing positioned within said channel whereby the fluid flowing within said channel is in contact with the exterior surface of said tubing, the said tubing conveying fluid at a temperature different from the received fluid such that there will exist a transfer of heat energy between the fluid flowing within the said channel and the fluid flowing within said tubing, thereby heating or cooling the fluid flowing within the said tubing and reducing the amount of heating or cooling otherwise required in the process utilizing the fluid flowing within the said tubing.

2. The fluid receiving vessel of claim 1 wherein one end of the said tubing is connected to a source of cold water and the other end is connected to a valving means wherein hot water is added, the resulting warm water being utilized and then collected by the said pan.

3. The pan of claim 1 wherein said pan is removable to enable cleaning of the said channel and external surfaces of the said tubing.

4. The pan means of claim 1 wherein the top surface of said pan is provided with non-slip.

5. The fluid receiving vessel of claim 1 wherein the fluid flowing within the said channel exits the vessel through a drain pipe means sealed to said fluid receiving vessel by the injection of a sealant into the region formed by the exterior surface of said drain pipe means and the inside surface of a hole penetrating the said vessel.

6. The fluid receiving vessel of claim 1 wherein the fluid flowing within the said channel exits the vessel through a drain pipe means sealed to said fluid receiving vessel by the compression of a pliable material means in the space formed by the exterior surface of said drain pipe means and a surface of the said vessel, the force for the said compression being provided by the rotation of a threaded means.

7. The fluid receiving vessel of claim 1 wherein said vessel forms the base of a shower bath.

8. The fluid receiving vessel of claim 1 wherein said vessel forms the base of a sink.

9. The fluid receiving vessel of claim 1 for use within an existing fixture wherein the said channel is routed to drain the fluid directly into the existing fixture drain.

* * * * *